US010712231B1

(12) United States Patent
Shannon

(10) Patent No.: US 10,712,231 B1
(45) Date of Patent: Jul. 14, 2020

(54) APPLIED HIGH SPEED DIGITAL IMAGE CORRELATION (HSDIC)

(71) Applicant: United Launch Alliance, L.L.C., Centennial, CO (US)

(72) Inventor: Ryan Shannon, Castle Rock, CO (US)

(73) Assignee: United Launch Alliance, L.L.C., Centennial, CO (US)

(*) Notice: Subject to any disclaimer, the term of this patent is extended or adjusted under 35 U.S.C. 154(b) by 137 days.

(21) Appl. No.: 16/106,820

(22) Filed: Aug. 21, 2018

Related U.S. Application Data

(60) Provisional application No. 62/562,476, filed on Sep. 24, 2017.

(51) Int. Cl.
| | |
|---|---|
| *G06T 7/73* | (2017.01) |
| *G01M 7/08* | (2006.01) |
| *G06T 7/246* | (2017.01) |
| *G06T 7/292* | (2017.01) |
| *G01M 17/00* | (2006.01) |

(52) U.S. Cl.
CPC ............ *G01M 7/08* (2013.01); *G01M 17/00* (2013.01); *G06T 7/248* (2017.01); *G06T 7/292* (2017.01); *G06T 7/74* (2017.01); *G06T 2207/10021* (2013.01); *G06T 2207/30241* (2013.01); *G06T 2207/30248* (2013.01)

(58) Field of Classification Search
CPC ........... G01M 7/08; G01M 7/00; G06T 7/248; G06T 7/292; G06T 7/74; G06T 2207/10021; G06T 2207/30241; G06T 2207/30248
See application file for complete search history.

(56) References Cited

U.S. PATENT DOCUMENTS

2005/0116088 A1* 6/2005 Telford ............... B64G 1/641
244/10

OTHER PUBLICATIONS

Lall, Pradeep, Dhananjay Panchagade, Deepti Iyengar, Sandeep Shantaram, Jeff Suhling, and Hubert Schrier. "High speed digital image correlation for transient-shock reliability of electronics." In 2007 Proceedings 57th Electronic Components and Technology Conference, pp. 924-939. IEEE, 2007. (Year: 2007).*

* cited by examiner

*Primary Examiner* — Carol Wang
(74) *Attorney, Agent, or Firm* — Sheridan Ross P.C.

(57) ABSTRACT

Embodiments of the disclosure provide systems and methods for testing of separating systems between a space vehicle and a launch vehicle, at a component level and/or at a system level, using High Speed Digital Image Correlation (HSDIC). Proposed embodiments integrate HSDIC into the separation testing processes to better determine system function without contacting the object under test. By applying HSDIC to objects under test, the previously immeasurable quantities may be measured and may provide results leading to more complete and more understandable measurements of interest. As one example, local coordinate systems may be generated indicating symmetry and/or lack of symmetry. Furthermore, stay out volumes may be verified. In some embodiments, trajectories associated with measure targets, (e.g., features of the object under test and/or patterns such as a speckle pattern) may be utilized to track and analysis movements as well as verify stay out volumes.

20 Claims, 10 Drawing Sheets

APPLIED HIGH SPEED DIGITAL IMAGE CORRELATION (HSDIC)

CROSS REFERENCE TO RELATED APPLICATION

The present application claims the benefits of and priority, under 35 U.S.C. § 119(e), to U.S. Provisional Application No. 62/562,476 filed Sep. 24, 2017 by Shannon and entitled "Applied High Speed Digital Image Correlation (HSDIC)" of which the entire disclosure is incorporated herein by reference for all purposes.

FIELD OF THE DISCLOSURE

Embodiments of the present disclosure relate generally to methods and systems for High Speed Digital Image Correlation (HSDIC) applied to various system and testing configurations and more particularly to applying HSDIC to testing of separating systems between a space vehicle and a launch vehicle, at a component level and/or at a system level.

BACKGROUND

Many test campaigns must be completed prior to a space launch. For example, Space Vehicle (SV) to Launch Vehicle (LV) match mate testing is performed to verify electrical and mechanical interfaces operate as desired. To verify these interfaces, the clamp band mechanism which secures the SV to the LV during launch but which must be released to separate the two is activated. Activation of clamp bands and re-contact with test specimen generates shock which can damage sensitive SV components and impact separation functions. During match mate separation testing, dynamic measurements are recorded such as electrical (continuity) and mechanical (shock) measurements. Visual confirmation of successful mechanism separation is also often required.

During testing, and to verify that the separation systems function as required, many transducer point measurements are acquired by a Data Acquisition System (DAS). However, these systems take a significant amount of time to install and to verify installation direction and scaling of sensors. Additionally, these systems add mass and stiffness (wires, mounts, etc.) to the clamp band and other structures which can influence measurements.

There are several other problems with DAS testing. For example, shock accelerometers have low frequency saturation issues, motion is difficult to measure with shock accelerometers, it is difficult to determine if separation motion is within a stay out volume, it is hard to identify artifacts of testing, among other problems. Hence, there is a need for improved methods and systems for testing of separating systems between a space vehicle and a launch vehicle.

BRIEF SUMMARY

Embodiments of the disclosure provide systems and methods for testing of separating systems between a space vehicle and a launch vehicle, at a component level and/or at a system level, using High Speed Digital Image Correlation (HSDIC). Proposed embodiments integrate HSDIC into the separation testing processes to better determine system function without contacting the object under test. By applying HSDIC to objects under test, the previously immeasurable quantities may be measured and may provide results leading to more complete and more understandable measurements of interest. As one example, local coordinate systems may be generated indicating symmetry and/or lack of symmetry. Furthermore, stay out volumes may be verified. In some embodiments, trajectories associated with measure targets, (e.g., features of the object under test and/or patterns such as a speckle pattern) may be utilized to track and analysis movements as well as verify stay out volumes.

In some embodiments, one or more configurations utilizing one or more high speed cameras may be utilized. Moreover, some aspects may incorporate one or more mirrors to achieve a similar result as multiple cameras and/or to obtain measurements for objects where a high-speed camera is incapable of being located. Although described with respect to a clamp band system and/or clamp band opening device, it should be appreciated that the techniques and configurations presented herein may be applied to other systems and/or other objects.

According to one embodiment, a method for testing of separating systems between a space vehicle and a launch vehicle can comprise receiving, by a data processing system, from one or more high definition cameras, a series of high-speed video frames, each frame of the series of frames capturing a region of interest on a test structure. In some cases, the one or more cameras can comprise a plurality of cameras. For example, the plurality of cameras can comprise a pair of cameras mounted on a bar and the pair of cameras can provide a stereoscopic view of the test structure. The test structure can comprise a representation of a Launch Vehicle (LV), a representation of a Space Vehicle (SV), a clamp band binding the representation of the LV to the representation of the SV, and a clamp band opening device operable to release the clamp band and allow the representation of the LV to separate from the representation of the SV. The video frames can be captured by the one or more high definition cameras during and after operation of the clamp band opening device. One or more Digital Image Correlation (DIC) processes can be applied by the data processing system to the received series of high-speed video frames. The DIC processes can be applied to the video using one or more of speckle patterns or targets applied to test structure, edges of the clamp band or clamp band opening device, or other distinguishing features of the representation of the LV, the representation of the SV, the clamp band, or the clamp band opening device.

Point trajectories for one or more components of interest in the region of interest on the test structure can be calculated by the data processing system and shock symmetry on the representation of the LV and representation of the SV can be identified in six degrees of freedom. The data processing system can fit primitive geometries to each calculated point trajectories for one or more components of interest in the region of interest on the test structure. The fitted primitive geometries can approximate the representation of the LV and the representation of the SV. The data processing system can track relative centerline motion of the representation of the LV and the representation of the SV during separation using the fitted primitive geometries. Additionally, or alternatively, the data processing system can detect one or more impact shocks on the representation of the LV or the representation of the SV based on the calculated point trajectories for the one or more components of interest in the region of interest on the test structure. The detected impact shocks can be quantified using local coordinate systems. In some cases, the data processing system can determine a position for each of the one or more components of interest in an interface control document based on the calculated point trajectories for the one or more components and verify stay out volumes using the determined position for each of the one or more components.

According to another embodiment, a system can comprise a processor and a memory coupled with and readable by the processor. The memory can store therein a set of instructions which, when executed by the processor, causes the processor to test separating systems between a space vehicle and a launch vehicle by receiving, from one or more high definition cameras, a series of high-speed video frames. Each frame of the series of frames can capture a region of interest on a test structure. In some cases, the one or more cameras can comprise a pair of cameras mounted on a bar and providing a stereoscopic view of the region of interest on the test structure. The test structure can comprise a representation of a Launch Vehicle (LV), a representation of a Space Vehicle (SV), a clamp band binding the representation of the LV to the representation of the SV, and a clamp band opening device operable to release the clamp band and allow the representation of the LV to separate from the representation of the SV, the video frames captured by the one or more high definition cameras during and after operation of the clamp band opening device.

One or more Digital Image Correlation (DIC) processes can be applied to the received series of high-speed video frames. The DIC processes can be applied to the video using one or more of speckle patterns or targets applied to test structure, edges of the clamp band or clamp band opening device, or other distinguishing features of the representation of the LV, the representation of the SV, the clamp band, or the clamp band opening device. Point trajectories can be calculated for one or more components of interest in the region of interest on the test structure and shock symmetry on the representation of the LV and representation of the SV can be identified in six degrees of freedom.

Testing can further comprise fitting primitive geometries to each calculated point trajectories for one or more components of interest in the region of interest on the test structure. The fitted primitive geometries can approximate the representation of the LV and the representation of the SV. Relative centerline motion of the representation of the LV and the representation of the SV can be tracked during separation using the fitted primitive geometries. Additionally, or alternatively, testing can comprise detecting one or more impact shocks on the representation of the LV or the representation of the SV based on the calculated point trajectories for the one or more components of interest in the region of interest on the test structure and quantifying the detected impact shocks using local coordinate systems. In some cases, testing can additionally, or alternatively, comprise determining a position for each of the one or more components of interest in an interface control document based on the calculated point trajectories for the one or more components and verifying stay out volumes using the determined position for each of the one or more components.

According to yet another embodiment, a non-transitory, computer-readable memory can comprise a set of instructions stored thereon which, when executed by a processor, causes the processor to test separating systems between a space vehicle and a launch vehicle by receiving, from one or more high definition cameras, a series of high-speed video frames, each frame of the series of frames capturing a region of interest on a test structure. The test structure can comprise a representation of a Launch Vehicle (LV), a representation of a Space Vehicle (SV), a clamp band binding the representation of the LV to the representation of the SV, and a clamp band opening device operable to release the clamp band and allow the representation of the LV to separate from the representation of the SV. The video frames can be captured by the one or more high definition cameras during and after operation of the clamp band opening device.

One or more Digital Image Correlation (DIC) processes can be applied to the received series of high-speed video frames. The DIC processes can be applied to the video using one or more of speckle patterns or targets applied to test structure, edges of the clamp band or clamp band opening device, or other distinguishing features of the representation of the LV, the representation of the SV, the clamp band, or the clamp band opening device. Point trajectories can be calculated for one or more components of interest in the region of interest on the test structure and shock symmetry on the representation of the LV and representation of the SV can be identified in six degrees of freedom.

Testing can further comprise fitting primitive geometries to each calculated point trajectories for one or more components of interest in the region of interest on the test structure. The fitted primitive geometries can approximate the representation of the LV and the representation of the SV. Relative centerline motion of the representation of the LV and the representation of the SV can be tracked during separation using the fitted primitive geometries. Additionally, or alternatively, testing can comprise detecting one or more impact shocks on the representation of the LV or the representation of the SV based on the calculated point trajectories for the one or more components of interest in the region of interest on the test structure and quantifying the detected impact shocks using local coordinate systems. In some cases, testing can additionally, or alternatively, comprise determining a position for each of the one or more components of interest in an interface control document based on the calculated point trajectories for the one or more components and verifying stay out volumes using the determined position for each of the one or more components.

Figure 1:
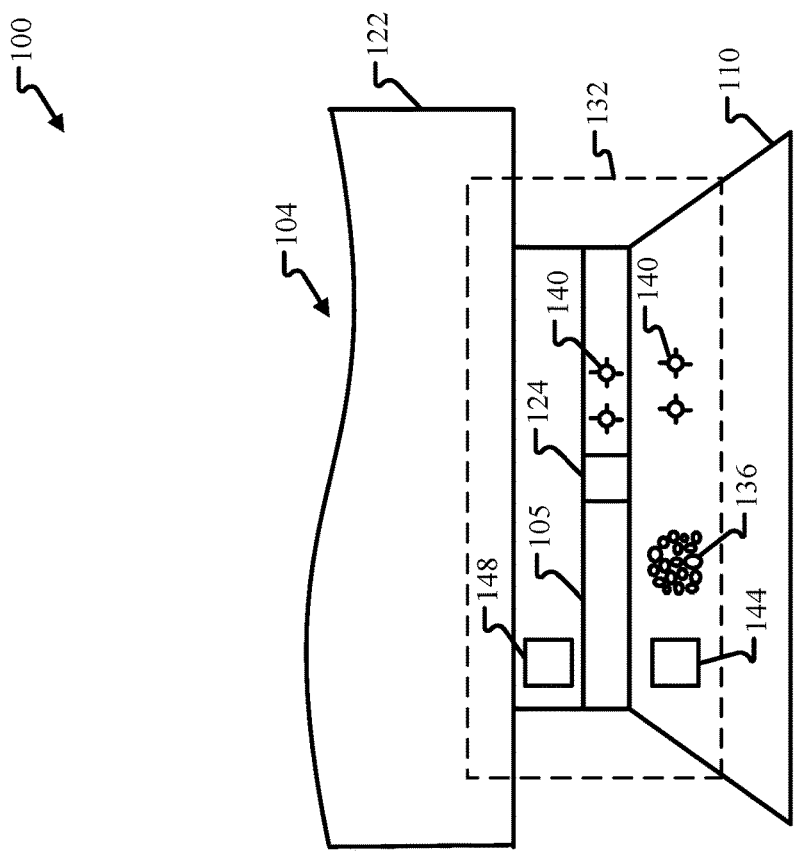
FIG. 1 illustrates components of an exemplary system for testing of separating systems between a space vehicle and a launch vehicle, at a component level and/or at a system level, using High Speed Digital Image Correlation (HSDIC) according to one embodiment of the present disclosure.
Figure 1:
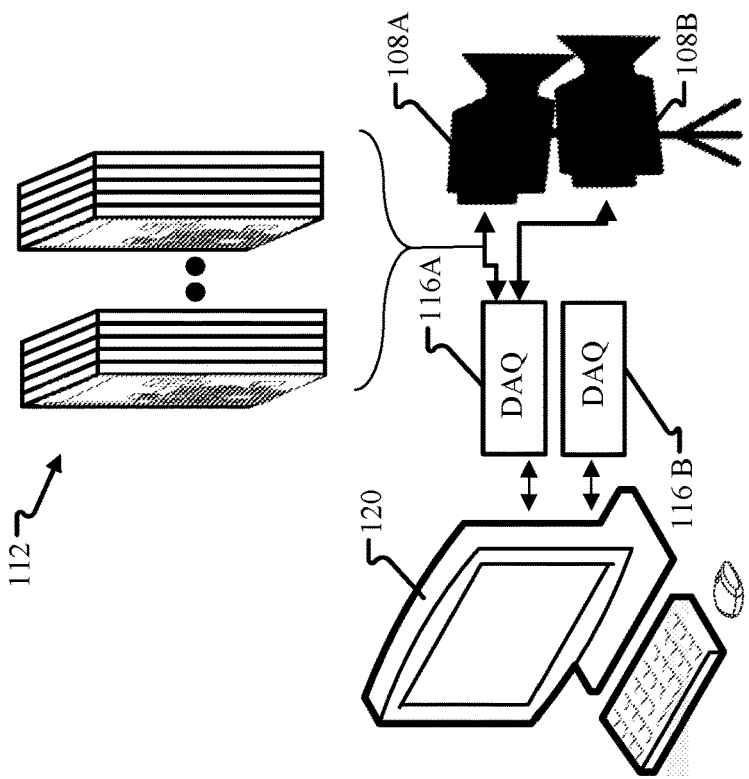

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Embodiments of the disclosure provide systems and methods for testing of separating systems between a space vehicle and a launch vehicle, at a component level and/or at a system level, using High Speed Digital Image Correlation (HSDIC). Proposed embodiments integrate HSDIC into the separation testing processes to better determine system function without contacting the object under test. By applying HSDIC to objects under test, the previously immeasurable quantities may be measured and may provide results leading to more complete and more understandable measurements of interest. As one example, local coordinate systems may be generated indicating symmetry and/or lack of symmetry. Furthermore, stay out volumes may be verified. In some embodiments, trajectories associated with measure targets, (e.g., features of the object under test and/or patterns such as a speckle pattern) may be utilized to track and analysis movements as well as verify stay out volumes.

In some embodiments, one or more configurations utilizing one or more high speed cameras may be utilized. Moreover, some aspects may incorporate one or more mirrors to achieve a similar result as multiple cameras and/or to obtain measurements for objects where a high-speed camera is incapable of being located. Although described with respect to a clamp band system and/or clamp band opening device, it should be appreciated that the techniques and configurations presented herein may be applied to other systems and/or other objects.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 illustrates components of an exemplary system for testing of separating systems between a space vehicle and a launch vehicle, at a component level and/or at a system level, using High Speed Digital Image Correlation (HSDIC) according to one embodiment of the present disclosure. The system 100 generally includes a test structure 104, one or more cameras 108A-B that obtain a series of images 112 at a desired frame rate, at least one data acquisition system 116A-B, and at least one data processing system 120. Sensor data, such as acceleration data, may be obtained from at least two sensors located within the field of view of the one or more cameras 108A-B. Further, the series of images 112 captured by the one or more cameras 108A-B may be used to derive displacement, velocity, and acceleration data for components within the field of view of the cameras 108A-B, and more specifically, within the region of interest 132. The data provided by the sensors may be used in combination with the optically-derived displacement, velocity, acceleration, and/or other measures for one or more components within the field of view of the one or more cameras 108A-B to determine the presence, or lack of, impacts, vibrations, or other forces.

The test structure 104 illustrated in FIG. 1 may be one of many test structures utilized in accordance with embodiments of the present disclosure. That is, although specific details of the test structure 104 are provided herein, such details should not be considered limiting as other test structures, equipment, and techniques exist for realizing one or more applications of high speed DIC for generating dynamic quantities of interest. As one example, test structures capable of supporting dropping mass, air gun, and/or explosive excitations are contemplated. Further, test structures capable of supporting one or more vibration analyses are contemplated as well. As illustrated in this example, the test structure can comprise a representation of a Launch Vehicle (LV) 110 or portion thereof, such as a conic adapter, a representation of Space Vehicle (SV) 122 or portion thereof such as an adapter or collar, and a band clamp 105. The test structure 104 can be assembled and monitored according to embodiments described herein to identify impacts, vibrations, and other dynamic forces and effects of releasing the clamp and separating the representation of the LV 110 from the representation of the SV 122.

With further reference to FIG. 1, the test structure 104 may include one or more components of interest 124, one or more non-filtered sensors 144, and/or an analog low-pass filtered sensor 148. In accordance with embodiments of the present disclosure, the systems and methods disclosed herein are particularly applicable to shock and vibration testing of components within the aerospace industry, geophysical drilling industry, and any other areas where shock and vibration, and, more particularly, shock and/or vibration of a non-periodic nature, is present. Due in part to camera memory limitations and a corresponding rate of acquiring images, techniques described herein may be equally applicable to periodic signals for the same or similar reasons as non-periodic signals because the periodic signal does not have time to complete multiple cycles.

The component of interest 124, also referred to as an object under test, may generally include any object undergoing testing for which dynamic quantities of interest are of concern. In this example, the component of interest can comprise a clamp band opening device and/or the clamp band itself. In some instances, the component of interest 124 may be located within a region of interest 132. As one non-limiting example, and in accordance with embodiments of the present disclosure, may be portions of the representation of the LV 110 and representation of the SV 122 near the clamp band 105 which may be subject to impact, shock, vibration, or other physical forces during or after operation of the clamp band opening device and the subsequent release of the clamp band and separation of the representation of the LV 110 from the representation of the SV 122. The region of interest 132 can comprise the area around the component of interest 124, such as the representation of the LV 110, the representation of the SV 122, or an area between the two created as they separate and into which the clamp band or portions thereof should not intrude as it releases, i.e., a stay out volume.

Optionally, the test structure 104 can include one or more non-filtered sensors 144 and one or more analog low-pass filtered sensors 148 that provide sensor data relating to the component of interest 124 and/or the test structure 104 to a data acquisition system 116A-B. Each of the sensors 144 and 148 may be selected according to a desired sensitivity, measurement range, frequency range, and resonant frequency. The non-filtered sensor 144 can be utilized to obtain raw sensor data resulting from the component of interest 124, and/or the test structure 104. Such raw sensor data is not subjected to an anti-aliasing filter, also referred to as an analog low-pass filter, and can be utilized to provide aliasing protection for optically-derived dynamic quantities of interest.

The analog low-pass filtered sensor 148 can be utilized to obtain filtered acceleration data resulting from the component of interest 124 and/or the test structure. The cutoff frequency of a filter for the analog low-pass filtered sensor 148 may be selected and/or may be adjusted based on a predetermined and/or selected criteria in conjunction with the data acquisition system 116A-B in order to prevent aliasing issues arising from high-amplitude and high-frequency sources of energy, such as those sources modeled by shock and shock pulses. Accordingly, the data acquisition system 116A-B as a whole, including the analog low-pass filtered sensor 148, but excluding the non-analog low-pass filtered sensor 144, are configured to minimize the effects of aliasing and ensure that the digitized data resulting from the analog-to-digital converter of the data acquisition system 116A-B is correct. Such an analog low-pass filter may be included in the analog low-pass filtered sensor 148, as part of a signal conditioner component within or outside of the data acquisition system 116A-B, and/or combinations thereof.

In accordance with embodiments of the present disclosure, the one or more cameras 108A-B can acquire a series of images 112 at a desired frame rate and provide the series of images 112 to a data acquisition system 116A-B. The data acquisition system 116A-B may be part of an overall data acquisition system, may be one or more separate standalone data acquisition systems, or may be combinations thereof. For example, the data acquisition system 116B may include one or more high speed video acquisition cards specifically configured to obtain a series of images 112 at a specified frame rate, or sampling rate, and resolution. As previously discussed, the sample rate may be configured based on an overall data acquisition system configuration and may be determined based on an expected maximum analysis frequency. However, when a maximum analysis frequency is unknown, the frame rate may be set to an exceedingly high value in accordance with the capabilities and limitations of the data acquisition system 116B and the data processing system 120. For example, the frame rate may be several thousand, e.g., 9000, frames per second.

Included at one or more locations on the test structure 104 and/or on the component of interest 124 can be a target pattern tracking pattern/mark 140. Additionally, or alternatively, the a speckle pattern 136, i.e., stochastic pattern, can be included on the test structure and/or component of interest. Since digital image correlation is an optical, non-contact method of measuring surface deformation in two or three dimensions, the process of acquiring displacement signals illustrative of surface deformation using Digital Image Correlation (DIC) relies on tracking the displacement of unique surface characteristics through a series of images 112. Such unique surface characteristics may comprise speckle pattern 136, a tracking pattern/mark 140, and/or distinct, easy to identify parts or features. The movement, or displacement, of a localized speckle pattern 136, the tracking pattern/mark 140 and/or part on a component of interest 124, and in accordance with embodiments of the present disclosure is utilized to generate a displacement signal for the component. Such a displacement signal may be differentiated to calculate a velocity or other dynamic quantity of interest component. Further, the velocity may be differentiated or subject to further calculation to generate another dynamic quantity of interest component, such as acceleration.

Qualitative high-speed video is a standard data product of such testing. Embodiments of the present disclosure integrate HSDIC into the separation testing process to better determine system function. Embodiments utilizing HSDIC can eliminate or augment standard instrumentation and can measure the immeasurable including, but not limited to, clamp band tension, by tracking targets 140, speckle patterns 136, corners or other distinguishable features of the clamp band 105, opening device or other component of interest 124, etc.

Using HSDIC processes, point trajectories for portions of the clamp band 105, opening device, and other components can be calculated and local six degrees-of-freedom coordinate systems can be used to identify separation shock symmetry on the representation of the LV 110 and representation of the SV 122. Embodiments make shock symmetry easier to identify as a function of clamp band tension or other parameters. Impact shocks created by operation of the clamp band opening device and/or contact of the separating claim band into components can be detected and quantified using local Coordinate Systems (CS). Video from the cameras 108A and 108B can be synchronized with data collected from the other sensors 144 and 148. Together, this synchronized data can be used, for example, to measure the source shock of the clamp band opening device even though this shock is typically too high for sensors such as bonded accelerometers to measure.

Using HSDIC processes, and as noted above, clamp band stay out volume can be verified. More specifically, using three-dimensional trajectories generated from the HSDIC processes, portions of the clamp band and other components can be positioned within Interface Control Document (ICD) stay out volumes in a three-dimensional space. Using these methods can eliminate manual frame-by-frame video estimates to verify stay out volume clamp band functional sweeps. Such embodiments also provide greater verification certainty, namely, subpixel level certainty, over human eyeballing of video frames.

Figure 2:
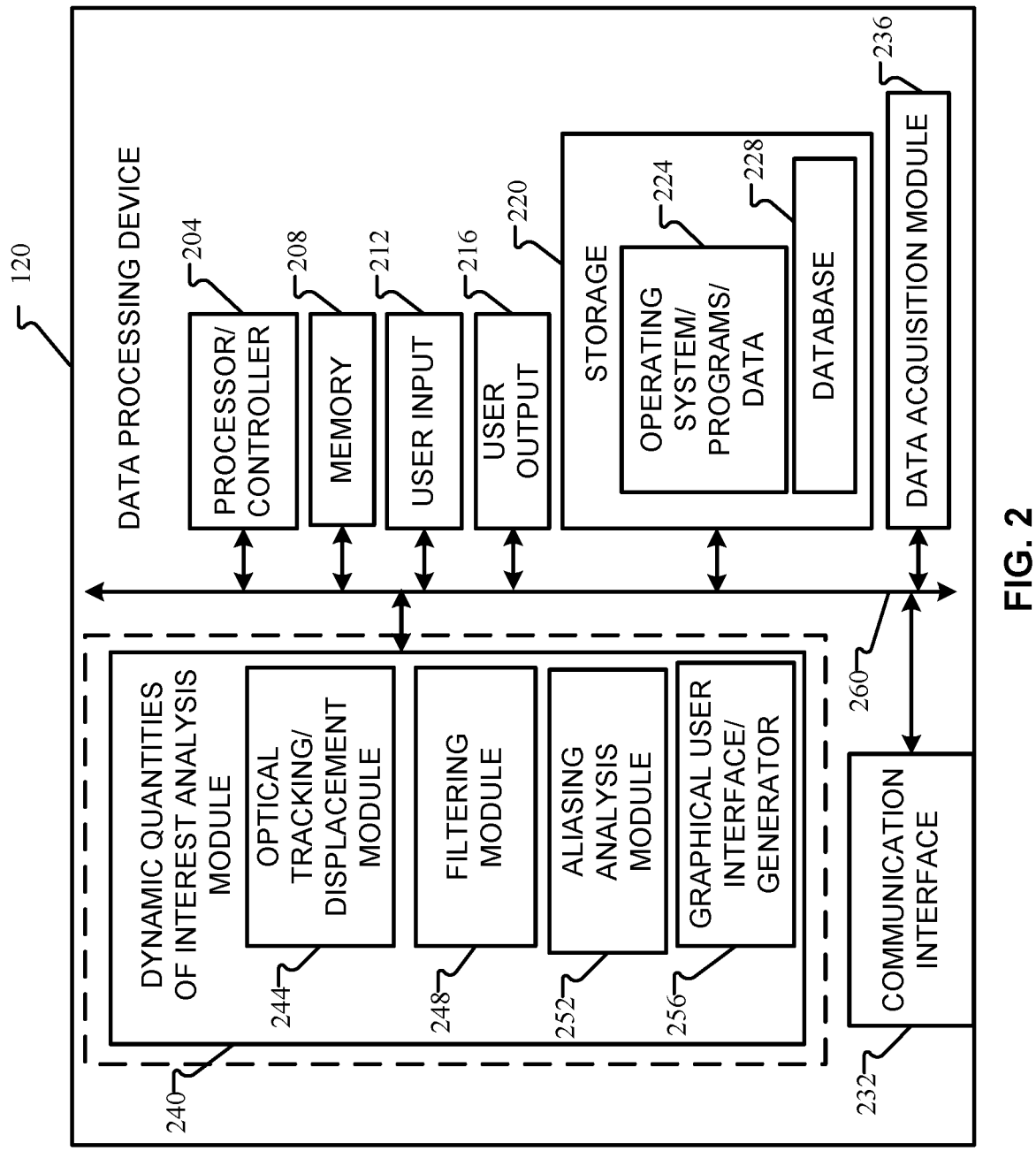
FIG. 2 is a block diagram illustrating components of an exemplary data processing system according to one embodiment of the present disclosure.

FIG. 2 depicts additional details with respect to a data processing system in accordance with embodiments of the present disclosure. More particularly, the data processing system 120 may generally include a processor 204, memory 208, user input 212, user output 216, storage 220, a communication interface 232, a dynamic quantities of interest analysis module 240, and, in some instances, a data acquisition module 236. Processor 204 is provided to execute instructions contained within memory 208. Accordingly, the processor 204 may be implemented as any suitable type of microprocessor or similar type of processing chip, such as any general-purpose programmable processor, digital signal processor (DSP) or controller for executing application programming contained within memory 208. Alternatively, or in addition, the processor 204 and memory 208 may be replaced or augmented with an application specific integrated circuit (ASIC), a programmable logic device (PLD), or a field programmable gate array (FPGA).

The memory 208 generally comprises software routines facilitating, in operation, pre-determined functionality of the data processing device 120. The memory 208 may be implemented using various types of electronic memory generally including at least one array of non-volatile memory cells (e.g., Erasable Programmable Read Only Memory (EPROM) cells or FLASH memory cells, etc.). The memory 208 may also include at least one array of Dynamic Random-Access Memory (DRAM) cells. The content of the DRAM cells may be pre-programmed and write-protected thereafter, whereas other portions of the memory 208 may be selectively modified or erased. The memory 208 may be used for either permanent data storage or temporary data storage. Alternatively, or in addition, data storage 220 may be provided. The data storage 220 may generally include storage for programs and data 224, storage for one or more modules included in the dynamic quantities of interest analysis module 240, and storage for a database 228. The database 228 may store data associated with the dynamic quantities of interest analysis module 240 and/or the data acquisition module 236. The communication interface 232 may allow the data processing device 120 to communicate over a communication network and/or communicate with one or more data acquisition systems 116A-B and/or directly with the one or more cameras 108A-B. Further, the data processing system 120 may include a portion of, or an entirety of, a data acquisition system 116 within the data acquisition module 236. For example, the data acquisition module 236 may include the same or similar functionality and capability as one or more of the data acquisition systems 116A-B as previously discussed.

The applications of generating dynamic quantities of interest with alias protection based on digital image optical tracking techniques may be at least partially provided by the dynamic quantities of interest analysis module 240. That is, the optical tracking/displacement module 244 of the dynamic quantities of interest analysis module 240 may generate one or more displacement signals based on optically-acquired information, such as optically-acquired information from the series of images 112. As will be discussed below, the optical tracking/displacement module 244 may utilize a variety of techniques to generate one or more displacement signals for the component of interest 124, the non-filtered sensor 144, the analog low-pass filtered sensor 148, and/or other elements within the region of interest 132 based on the series of images 112.

The optical tracking/displacement module 244 may utilize a variety of motion tracking methods. Examples of motion tracking methods include, but are not limited to, target motion tracking, feature-based motion tracking, pattern projection tracking, and DIC tracking. Whereas a special pattern and/or other target may be affixed to a component of interest for DIC tracking and target motion tracking techniques, less invasive motion tracking methods, such as feature-based motion tracking and pattern projection tracking may be utilized. For example, pattern projection-based tracking, where a pattern is projected and detected, may be utilized in some instances. However, due to the inherent limitations in pattern projection technology (e.g., being limited to a specific frame rate,) applications of such tracking techniques may be limited in practice. In some cases, a removable tape with DIC patterns may be attached.

The filtering module 248 of the dynamic quantities of interest analysis module 240 may apply one or more filtering algorithms to remove or otherwise reduce an amount of noise from one or more of the previously mentioned displacement signals. That is, in accordance with embodiments of the present disclosure, the filtering module 248 may apply wavelet filtering techniques to reduce or otherwise remove noise from one or more displacement signals generated by the optical tracking/displacement module 244. Alternatively, or in addition, the filtering module 248 may utilize best fit techniques to adjust a filter type, and, in some instances, other characteristics of the filter, such as, but not limited to, a decomposition level and whether to implement thresholding, to achieve a best fit between an optically-derived quantity of interest and an associated sensor-derived dynamic quantity of interest.

The aliasing analysis module 252 of the dynamic quantities of interest analysis module 240 may apply one or more techniques to determine if aliasing is, or is likely to be, present or otherwise influence one or more optically-derived (e.g., DIC-derived) dynamic quantities of interest. A comparison can be made between the data acquired from the non-filtered sensor 144 and the analog low-pass filtered sensor 148 to determine if aliasing at the non-filtered sensor 144 is contributing to or otherwise causing erroneous results in the data acquired from the analog low-pass filtered sensor 148 and/or the optically-derived dynamic quantities of interest.

Figure 3:
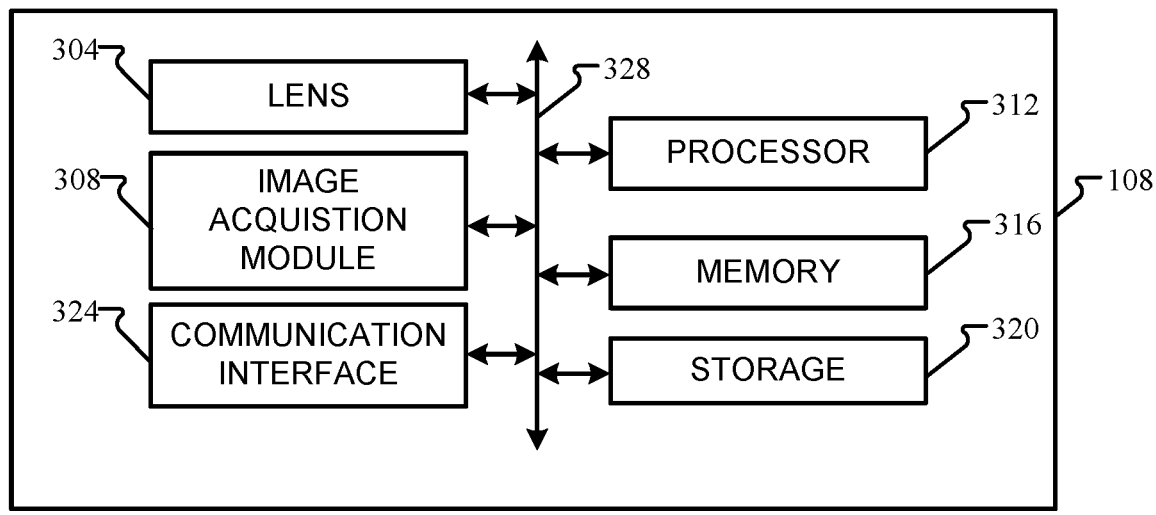
FIG. 3 is a block diagram illustrating components of an exemplary camera and data acquisition system according to one embodiment of the present disclosure.
Figure 3:
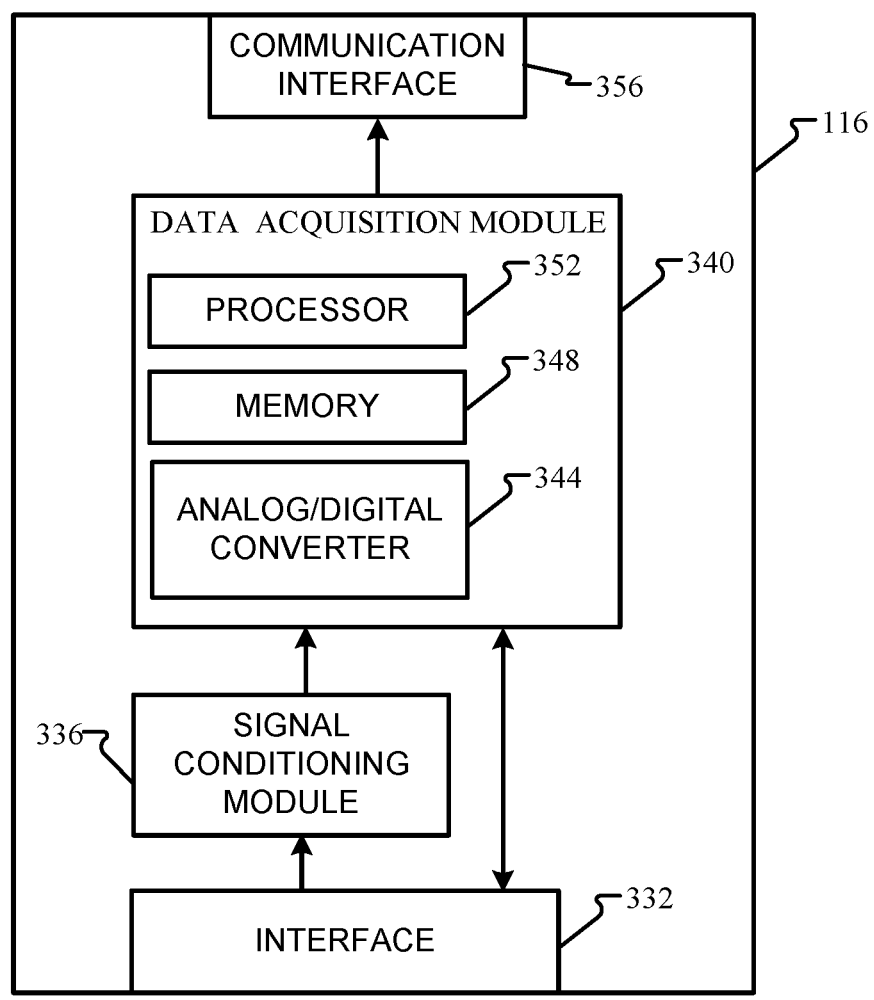

In accordance with embodiments of the present disclosure, additional details of the one or more cameras 108A-B and the data acquisition system 116A-B are provided in FIG. 3. The one or more cameras 108A-B may include a lens 304, image acquisition module 308, communication interface 324, processor 312, memory 316, storage 320, and a bus 328. The lens 304 may focus light indicative of an image onto a surface such that the image acquisition module 308 may convert the light into a digital image. The processor 312 may be the same as or similar to the processor/controller 204 previously discussed; accordingly, the description of processor 312 has been omitted. The memory 316 generally comprises software routines facilitating, in operation, pre-determined functionality of the one or more cameras 108A-B and may be used for either permanent data storage or temporary data storage. The memory 316 may be the same as or similar to the memory 208; accordingly, the description of the memory 316 has been omitted. The data storage 320 may generally include storage for programs and data, storage for one or more modules included in the one or more cameras 108A-B, and storage for a series of images 112. That is, the storage 320 may acquire a series of images 112 and provide the series of images 112 to the data processing system 120 via the communication interface 324 and/or the data acquisition system 116A-B. In some instances, the cameras 108A-B may obtain the series of images 112 during a test; such series of images 112 may be stored within the memory 316 and/or storage 320 such that bandwidth limitations of the data acquisition system as well as the cables connecting the cameras 108A-B to either the data acquisition system 116A-B or the data processing system 120 do not affect the image acquisition process. Accordingly, acquired series of images 112 may be subsequently transferred to and analyzed at the data processing system 120. Various components of the one or more cameras 108A-B may communicate utilizing the bus 328.

In accordance with embodiments of the present disclosure, the data acquisition system 116A-B may include an interface 332 for receiving one or more signals. The interface 332 may receive signals from the non-filtered sensor 144 and the analog low-pass filtered sensor 148. The signal from the analog low-pass filtered sensor 148 may be passed to the signal conditioning module 336. The signal conditioning module 336 may apply a low-pass filter with a cutoff frequency and cutoff rate as previously discussed. The signal from the non-filtered sensor 144 and the analog low-pass filtered sensor 148 may then be supplied to the data acquisition module 340. The data acquisition module 340 may include a processor 352, memory 348, and an analog/digital converter 344. The processor 352 may be the same as or similar to the processor/controller 204 previously discussed; accordingly, the description of processor 352 has been omitted. The memory 348 generally comprises software routines facilitating, in operation, pre-determined functionality of the data acquisition system 116A-B and may be used for either permanent data storage or temporary data storage. The memory 348 may be the same as or similar to the memory 208; accordingly, the description of the memory 348 has been omitted. In operation, the analog/digital converter 344, together with the processor 352 and the memory 348, may sample one or more signals from the interface 332 and convert the signals into digital form. The digitized signals may be stored temporarily in the memory 348 before being passed to the data processing system 120 via a communication interface 356. Alternatively, or in addition, the data acquisition system 116A-B may be included within, or part of, the data processing system 120; accordingly, the digitized signals may be passed to other components of the data processing system 120.

In some instances, the data acquisition system 116A-B may include the ability to receive the series of images 112 from the one or more cameras 108A-B. The series of images 112, already having been digitized, may, in some instances, be conditioned via the signal conditioning module 336 and may then be provided to the data processing system 120 via the communication interface 356. In other instances, the series of images 112 from the one or more cameras 108A-B may be provided directly to the data processing system 120. It should be understood that a series of images 112 refers to one or more images from one or more cameras 108A-B. That is, in accordance with embodiments of the present disclosure, a series of images 112 may be acquired by one or more cameras 108A-B and may be provided as a series or individually to the data processing system 120. In an embodiment, an "image" may include a full image. In another embodiment, an "image" may include a portion of an image, a segment of a full image, a thumbnail of an image, and/or an icon that pertains to an image. Another embodiment of an "image" may include a photograph and/or a digital image that can be captured by an image capture device, such as, for example, the one or more cameras 108A-B. Certain embodiments of a streaming image may include a video that may be captured by the one or more cameras 108A-B, and the streaming image, or images, may be provided to the data acquisition system 116A-B and/or the data processing system 120.

Figure 4:
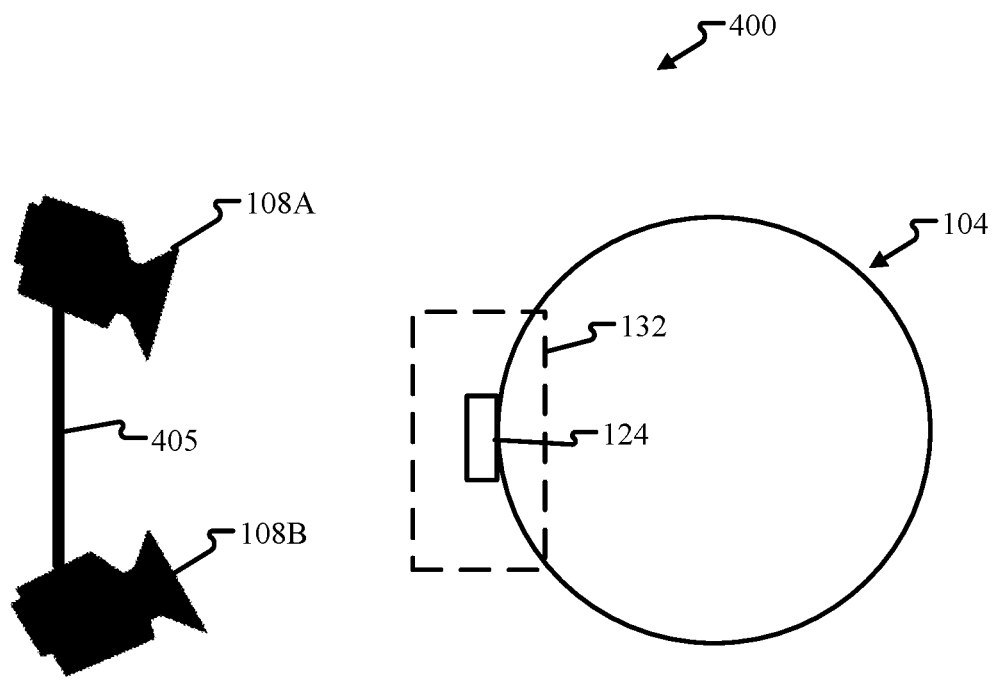
FIG. 4 is a diagram illustrating an exemplary arrangement of high-speed cameras and a test structure for testing of separating systems according to one embodiment of the present disclosure.

FIG. 4 is a diagram illustrating an exemplary arrangement of high-speed cameras and a test structure for testing of separating systems according to one embodiment of the present disclosure. More specifically, this example illustrates a testing system 400 including a test structure 104 as described above and presented in a top view here. In this arrangement, two high-speed video cameras 108A and 108B can be mounted on a mounting structure 405. According to one embodiment, this mounting structure 405 can comprise a bar or rod constructed of carbon fiber, aluminum, stainless steel, or other suitable materials with mounting brackets or other structures adapted to accept and retain the cameras 108A and 108B when installed thereon. In this way, the mounting structure provides a means for quickly and accurately mounting and positioning the cameras with the proper spacing and orientation for which the system is calibrated. The mounting structure 405 with the cameras 108A and 108B can further be mounted on a stand or other structure (not shown here) and positioned to capture a view of a component of interest 124 and region of interest 132, in this case, along a side of the testing structure 104. From this view, the cameras 108A and 108B can capture high-speed video which can be provided to a data acquisition system 116 (not shown here) and/or data processing system 120 (not shown here) as described above. This arrangement can be adapted to provide a tight Field Of View (FOV) which can in turn provide more pixels over a smaller area thereby increasing motion sensitivity of the HSDIC processes applied by the data processing system 120. However, this arrangement does not provide a view of the rear or other sides of the testing structure 104.

Figure 5:
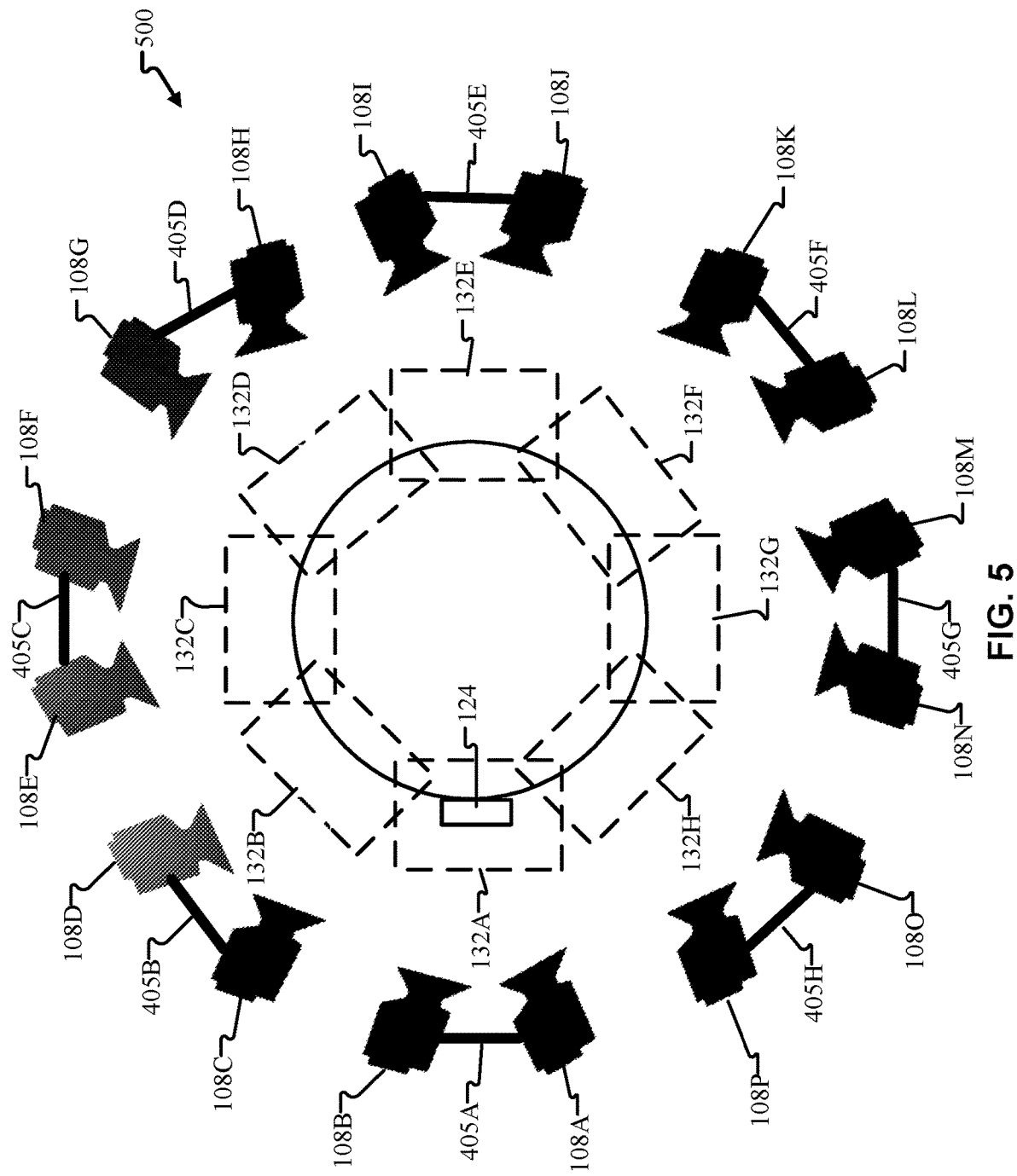
FIG. 5 is a diagram illustrating an exemplary arrangement of high-speed cameras and a test structure for testing of separating systems according to an alternative embodiment of the present disclosure.

FIG. 5 is a diagram illustrating an exemplary arrangement of high-speed cameras and a test structure for testing of separating systems according to an alternative embodiment of the present disclosure. This example illustrates a testing system 500 is similar to the system 400 described above including a test structure 104 presented in a top view here. In this example, however, multiple pairs of high speed cameras 108A-108P, each pair mounted on a mounting structure 405A-405H as described above can be positioned at various locations around the testing structure 104 to provide a wider view of the testing structure 104. Such a view can capture not only the component of interest but multiple regions of interest 132A-132H around the testing structure 104. From this view, the cameras 108A and 108B can capture high-speed video of each region of interest 132A-132H which can be provided to a data acquisition system 116 (not shown here) and/or data processing system 120 (not shown here) as described above. This arrangement can be adapted to provide a wide, perhaps even 360 degree, FOV. However, this arrangement significantly increases the cost over the previous embodiment due to the multiple pairs of cameras 108A-108P.

Figure 6:
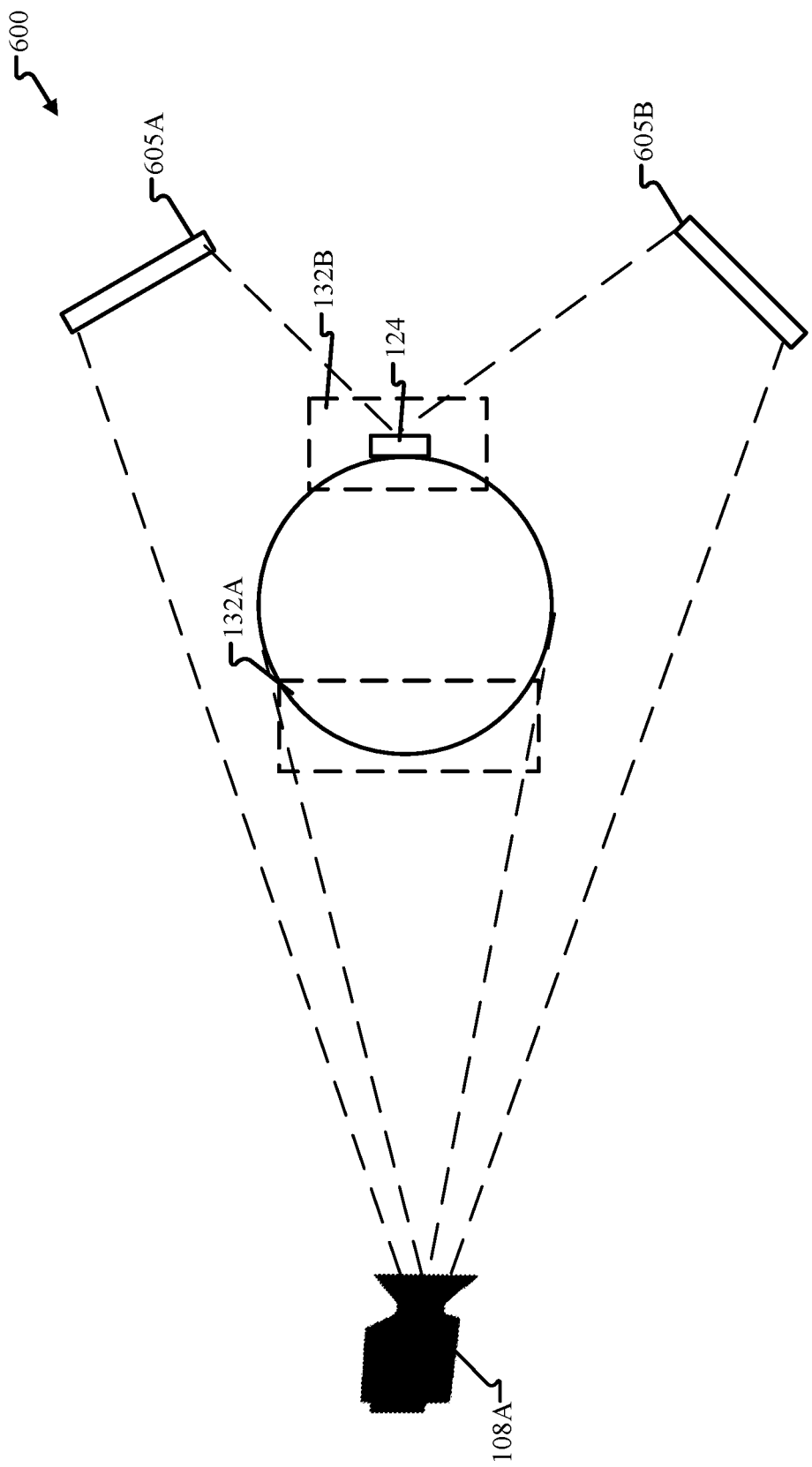
FIG. 6 is a diagram illustrating an exemplary arrangement of high-speed cameras and a test structure for testing of separating systems according to another alternative embodiment of the present disclosure.

FIG. 6 is a diagram illustrating an exemplary arrangement of high-speed cameras and a test structure for testing of separating systems according to another alternative embodiment of the present disclosure. This example illustrates a testing system 600 is similar to those described above including a test structure 104 presented in a top view here. In this example, a single camera 108A is mounted in a position to capture and region of interest 132A on the test structure 104 that is opposite from or behind the region of interest of interest 132B that includes the component of interest 124, e.g., the clamp band opening device. In other cases, the regions of interest 132A and 132B may not be opposite but may include one region 132B being out of view from the camera 108A. Accordingly, the system 600 also includes a set of mirrors 605A and 605B positioned within the FOV of the camera 108A and further positioned to capture in reflection the region of interest that is out of the FOV of the camera 108A. In this way, the single camera 108A can capture two, e.g., both front and rear, regions of interest 132A and 132B. However, the setup of this system 600 becomes more complex relative to other embodiments due to the positioning of the mirrors.

Figure 7:
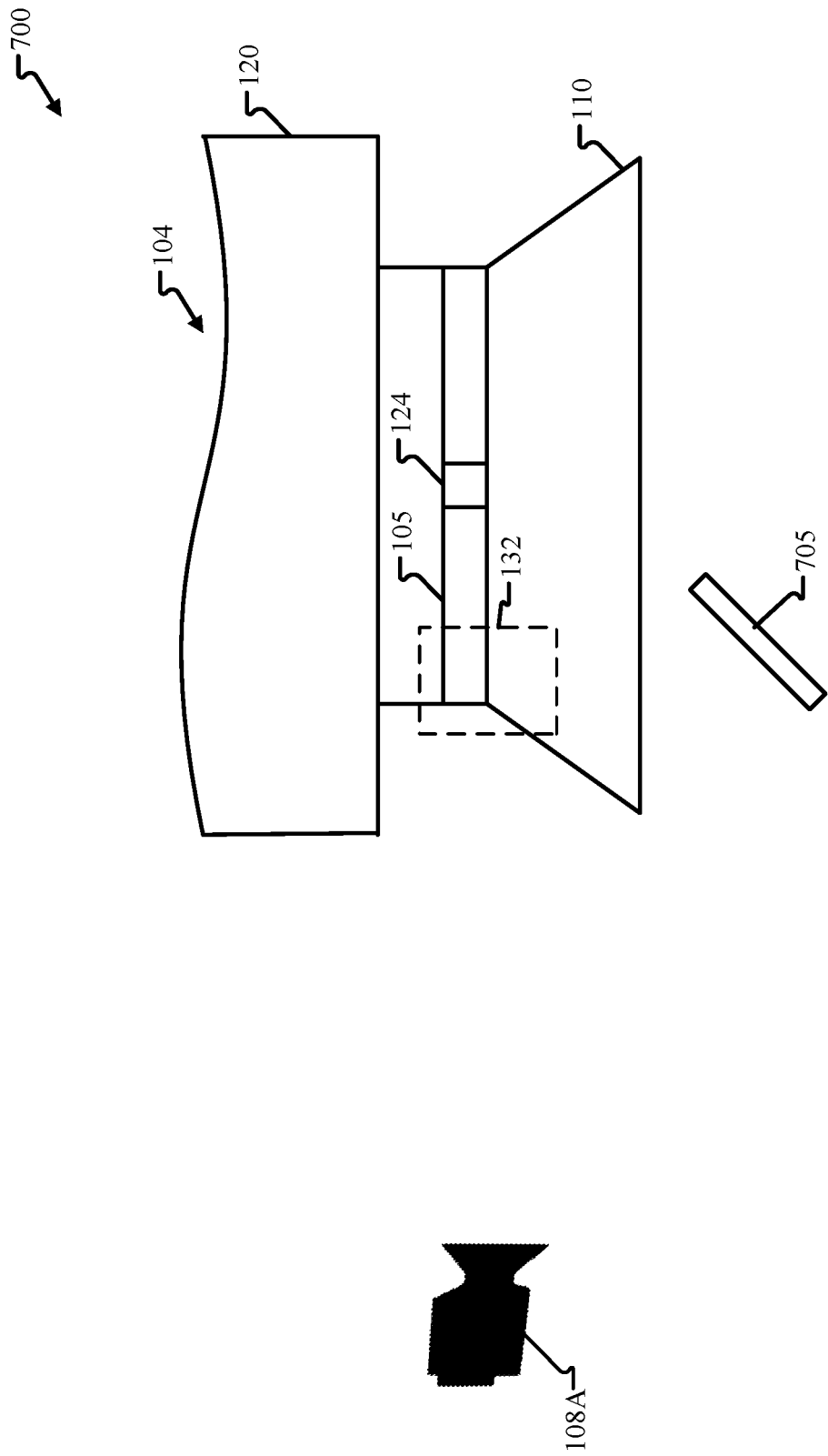
FIG. 7 is a diagram illustrating an exemplary arrangement of high-speed cameras and a test structure for testing of separating systems according to a further alternative embodiment of the present disclosure.

FIG. 7 is a diagram illustrating an exemplary arrangement of high-speed cameras and a test structure for testing of separating systems according to a further alternative embodiment of the present disclosure. This example illustrates a testing system 700 is similar to those described above including a test structure 104 presented in a side view here. In this example, a single camera 108A is mounted in a position to capture and region of interest 132 on one side the test structure 104. Additionally, the system includes a mirror 705 that is positioned within a FOV of the camera 108A and to capture in reflection a portion of the region of interest 132 that is underneath the test structure 104 and behind the surface captured in the FOV of the camera 108A. According to one embodiment, the mirror 705 can also be positioned so that it is not crushed by conic adapter or other representation of the LV 110 as it is released and falls. This embodiment can also be used with internal point transducer locations providing additional internal measurements. However, the setup of this system 700 can be more complex relative to other embodiments due to the positioning of the mirror 705.

Figure 8:
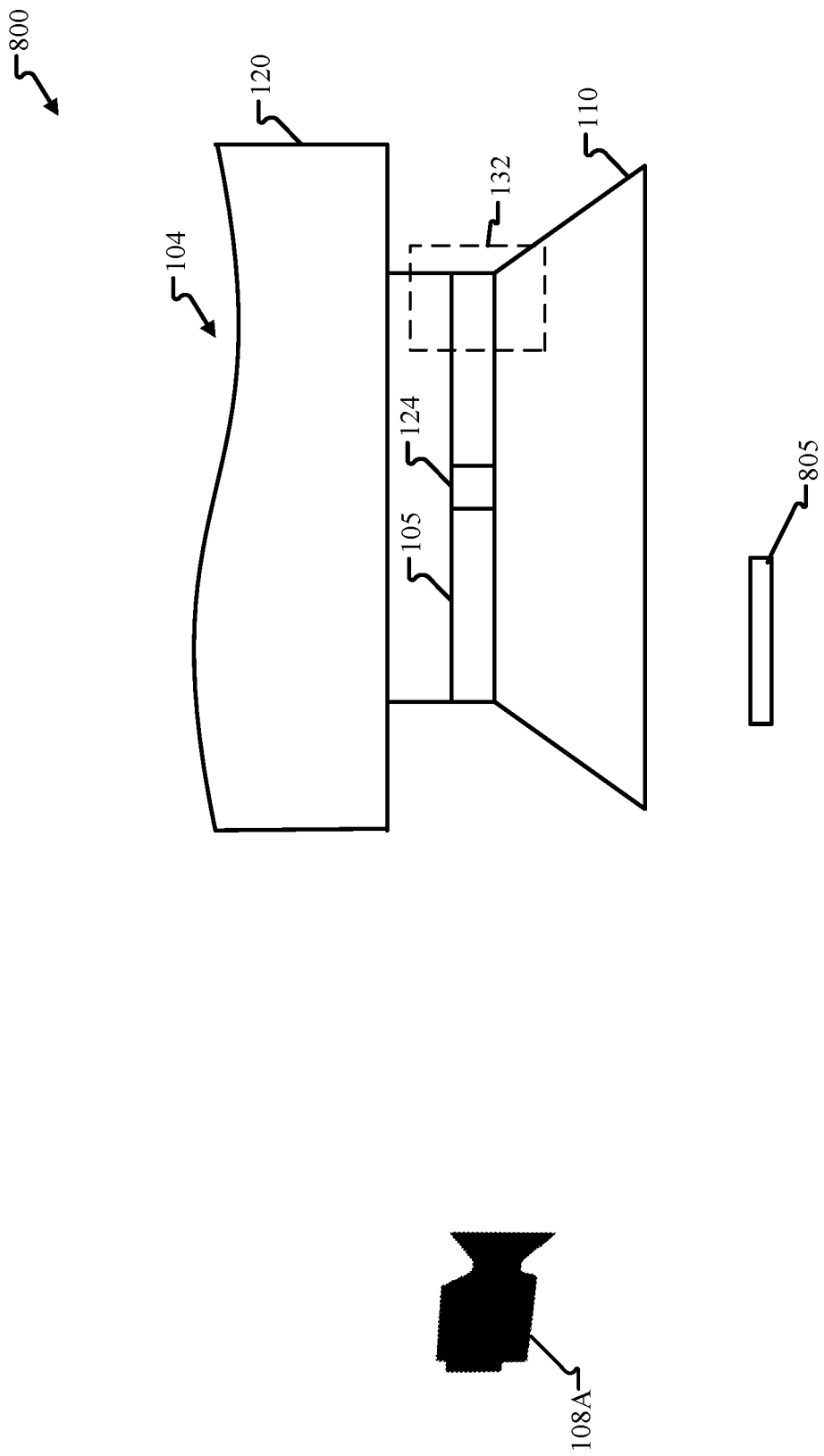
FIG. 8 is a diagram illustrating an exemplary arrangement of high-speed cameras and a test structure for testing of separating systems according to yet another alternative embodiment of the present disclosure.

FIG. 8 is a diagram illustrating an exemplary arrangement of high-speed cameras and a test structure for testing of separating systems according to yet another alternative embodiment of the present disclosure. Similar to the example of FIG. 7, this example illustrates a testing system 800 including a test structure 104 presented in a side view with a single camera 108A on one side the test structure 104 and a mirror 805 that is positioned within a FOV of the camera 108A. In this example, the mirror 805 capture in reflection a region of interest 132 that is underneath the test structure 104 and not directly observable within the FOV of the camera 108A. According to one embodiment, the mirror 805 can also be positioned so that it is not crushed by conic adapter or other representation of the LV 110 as it is released and falls. This embodiment can also be used with internal point transducer locations providing additional internal measurements. However, the setup of this system 800 can be more complex relative to other embodiments due to the positioning of the mirror.

Figure 9:
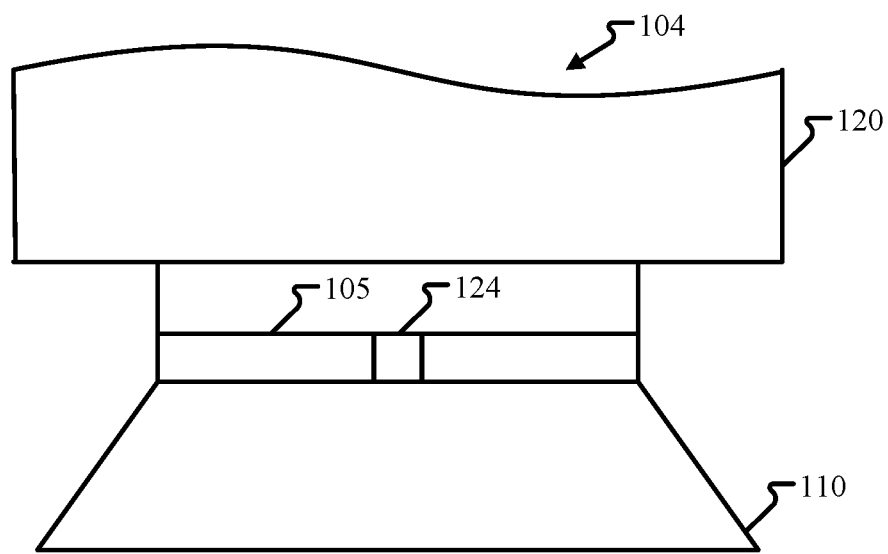
FIG. 9 is a diagram illustrating an exemplary arrangement of high-speed cameras and a test structure for testing of separating systems according to still another alternative embodiment of the present disclosure.
Figure 9:
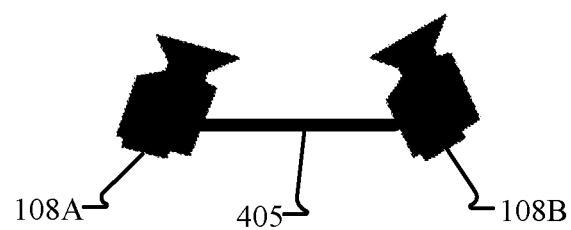

FIG. 9 is a diagram illustrating an exemplary arrangement of high-speed cameras and a test structure for testing of separating systems according to still another alternative embodiment of the present disclosure. This example illustrates a testing system 900 is similar to those described above including a test structure 104 presented in a side view here. In this example, two high-speed video cameras 108A and 108B can be mounted on a mounting structure 405 as described above with reference to FIG. 4 but positioned underneath the test structure 104 is a location so that they will not be crushed by the conic adapter or other representation of the LV 110 as it is released and falls. This arrangement can capture a component of interest (not shown here) and/or region of interest (not shown here) underneath or inside of the test structure and can record such measurement locations with tight window of pixels to increase measurement resolution.

Figure 10:
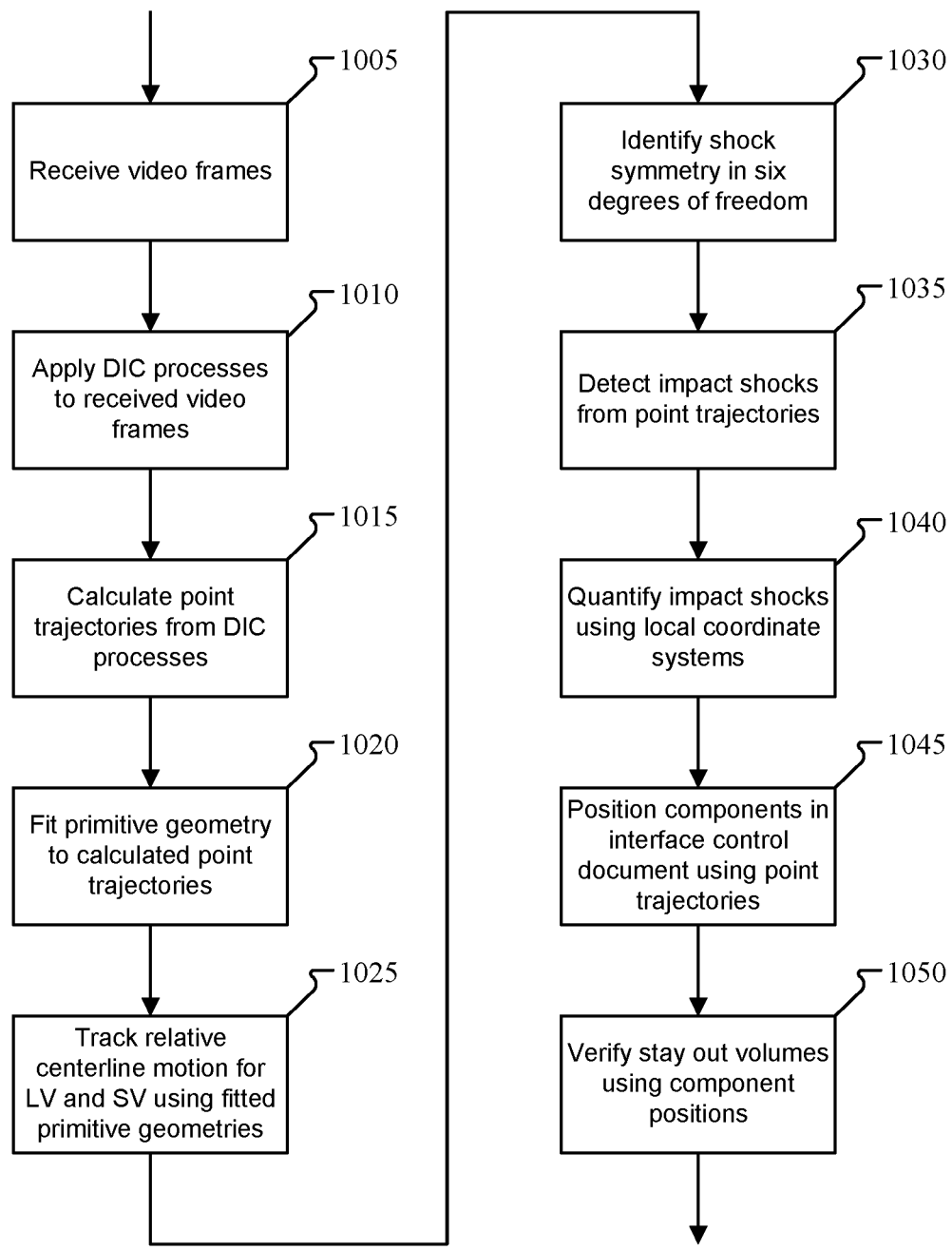
FIG. 10 is a flowchart illustrating an exemplary process for testing of separating systems between a space vehicle and a launch vehicle using HSDIC according to one embodiment of the present disclosure.

FIG. 10 is a flowchart illustrating an exemplary process for testing of separating systems between a space vehicle and a launch vehicle using HSDIC according to one embodiment of the present disclosure. As illustrated in this example, testing of separating systems between a space vehicle and a launch vehicle can comprise receiving 1005, by the data processing system 120, from one or more high definition cameras 108A and 108B, a series of high-speed video frames. Each frame of the series of frames can capture a region of interest 132 on a test structure 104. The test structure 104 can comprise a representation of a LV 110, a representation of a SV 122, a clamp band 105 binding the representation of the LV 110 to the representation of the SV 122, and a clamp band opening device operable to release the clamp band and allow the representation of the LV to separate from the representation of the SV. The video frames can be captured by the one or more high definition cameras 108A and 108B during and after operation of the clamp band opening device. According to one embodiment, the one or more cameras 108A and 108B can comprise a plurality of cameras. For example, the plurality of cameras can comprise a pair of cameras 108A and 108B mounted on a bar 405 and the pair of cameras 108A and 108B can provide a stereoscopic view of the region of interest 132 on the test structure 104.

The data processing system 120 can apply 1010 one or more DIC processes to the received series of high-speed video frames and calculate 1015 point trajectories for one or more components of interest 124 in the region of interest 132 on the test structure 104. The data processing system 120 can also identify 1030 shock symmetry on the representation of the LV and representation of the SV in six degrees of freedom. The DIC processes can be applied 1010 to the video using one or more of speckle patterns 136 or targets 140 applied to test structure 104, edges of the clamp band 105 or clamp band opening device, or other distinguishing features of the representation of the LV 110, the representation of the SV 122, the clamp band 105, or the clamp band opening device.

According to one embodiment, the data processing system 120 can fit primitive geometries to each calculated point trajectory for the one or more components of interest 124 in the region of interest 132 on the test structure 104. The fitted primitive geometries can approximate the representation of the LV 110 and the representation of the SV 122. Using the fitted primitive geometries, the data processing system 120 can track relative centerline motion of the representation of the LV 110 and the representation of the SV 122 during separation.

The data processing system 120 can also detect 1035 one or more impact shocks on the representation of the LV 110 or the representation of the SV 122 based on the calculated point trajectories for the one or more components of interest 124 in the region of interest 132 on the test structure 104 and can quantify 1040 the detected impact shocks using local coordinate systems. A position for each of the one or more components of interest 124 in an interface control document can also be determined 1045 by the data processing system 120 based on the calculated point trajectories for the one or more components. The data processing system 120 can then verify 1050 stay out volumes, e.g., defined in the interface control document, using the determined position for each of the one or more components.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for testing of separating systems between a space vehicle and a launch vehicle, the method comprising:
receiving, by a data processing system, from one or more high definition cameras, a series of high-speed video frames, each frame of the series of high-speed video frames capturing a region of interest on a test structure, the test structure comprising a representation of a Launch Vehicle (LV), a representation of a Space Vehicle (SV), a clamp band binding the representation of the LV to the representation of the SV, and a clamp band opening device operable to release the clamp band and allow the representation of the LV to separate from the representation of the SV, the video frames captured by the one or more high definition cameras during and after operation of the clamp band opening device;

applying, by the data processing system, one or more Digital Image Correlation (DIC) processes to the received series of high-speed video frames;

calculating, by the data processing system, point trajectories for one or more components of interest in the region of interest on the test structure; and identifying, by the data processing system, shock symmetry on the representation of the LV and representation of the SV in six degrees of freedom.

2. The method of claim 1, wherein the one or more high definition cameras comprise a plurality of cameras.

3. The method of claim 2, wherein the plurality of cameras comprise a pair of cameras mounted on a bar and wherein the pair of cameras provide a stereoscopic view of the region of interest on the test structure.

4. The method of claim 1, wherein the DIC processes are applied to the series of high-speed video frames using one or more of speckle patterns or targets applied to the test structure, edges of the clamp band or clamp band opening device, or other distinguishing features of the representation of the LV, the representation of the SV, the clamp band, or the clamp band opening device.

5. The method of claim 1, further comprising:
fitting, by the data processing system, primitive geometries to each calculated point trajectory for one or more components of interest in the region of interest on the test structure, the fitted primitive geometries approximating the representation of the LV and the representation of the SV; and
tracking, by the data processing system, relative centerline motion of the representation of the LV and the representation of the SV during separation using the fitted primitive geometries.

6. The method of claim 1, further comprising:
detecting, by the data processing system, one or more impact shocks on the representation of the LV or the representation of the SV based on the calculated point trajectories for the one or more components of interest in the region of interest on the test structure; and
quantifying, by the data processing system, the detected one or more impact shocks using local coordinate systems.

7. The method of claim 1, further comprising determining, by the data processing system, a position for each of the one or more components of interest in an interface control document based on the calculated point trajectories for the one or more components of interest.

8. The method of claim 7, further comprising verifying, by the data processing system, stay out volumes using the determined position for each of the one or more components of interest.

9. A system comprising:
a processor; and
a memory coupled with and readable by the processor and storing therein a set of instructions which, when executed by the processor, causes the processor to test separating systems between a space vehicle and a launch vehicle by:
receiving, from one or more high definition cameras, a series of high-speed video frames, each frame of the series of high-speed video frames capturing a region of interest on a test structure, the test structure comprising a representation of a Launch Vehicle (LV), a representation of a Space Vehicle (SV), a clamp band binding the representation of the LV to the representation of the SV, and a clamp band opening device operable to release the clamp band and allow the representation of the LV to separate from the representation of the SV, the video frames captured by the one or more high definition cameras during and after operation of the clamp band opening device;

applying one or more Digital Image Correlation (DIC) processes to the received series of high-speed video frames;

calculating point trajectories for one or more components of interest in the region of interest on the test structure; and identifying shock symmetry on the representation of the LV and representation of the SV in six degrees of freedom.

10. The system of claim 9, wherein the one or more cameras comprise a plurality of cameras and wherein the plurality of cameras comprise a pair of cameras mounted on a bar and wherein the pair of cameras provide a stereoscopic view of the region of interest on the test structure.

11. The system of claim 9, wherein the DIC processes are applied to the series of high-speed video frames using one or more of speckle patterns or targets applied to the test structure, edges of the clamp band or clamp band opening device, or other distinguishing features of the representation of the LV, the representation of the SV, the clamp band, or the clamp band opening device.

12. The system of claim 9, wherein the testing further comprises:
fitting primitive geometries to each calculated trajectory for one or more components of interest in the region of interest on the test structure, the fitted primitive geometries approximating the representation of the LV and the representation of the SV; and
tracking relative centerline motion of the representation of the LV and the representation of the SV during separation using the fitted primitive geometries.

13. The system of claim 9, wherein testing further comprises:
detecting one or more impact shocks on the representation of the LV or the representation of the SV based on the calculated point trajectories for the one or more components of interest in the region of interest on the test structure; and
quantifying the detected one or more impact shocks using local coordinate systems.

14. The system of claim 9, wherein testing further comprises determining a position for each of the one or more components of interest in an interface control document based on the calculated point trajectories for the one or more components of interest.

15. The system of claim 14, wherein testing further comprises verifying stay out volumes using the determined position for each of the one or more components of interest.

16. A non-transitory, computer-readable memory comprising a set of instructions stored thereon which, when executed by a processor, causes the processor to test separating systems between a space vehicle and a launch vehicle by:
receiving, from one or more high definition cameras, a series of high-speed video frames, each frame of the series of high-speed video frames capturing a region of interest on a test structure, the test structure comprising a representation of a Launch Vehicle (LV), a representation of a Space Vehicle (SV), a clamp band binding the representation of the LV to the representation of the SV, and a clamp band opening device operable to release the clamp band and allow the representation of the LV to separate from the representation of the SV, the video frames captured by the one or more high definition cameras during and after operation of the clamp band opening device;

applying one or more Digital Image Correlation (DIC) processes to the received series of high-speed video frames;

calculating point trajectories for one or more components of interest in the region of interest on the test structure; and identifying shock symmetry on the representation of the LV and representation of the SV in six degrees of freedom.

17. The non-transitory, computer-readable memory of claim 16, wherein the DIC processes are applied to the series of high-speed video frames using one or more of speckle patterns or targets applied to the test structure, edges of the clamp band or clamp band opening device, or other distinguishing features of the representation of the LV, the representation of the SV, the clamp band, or the clamp band opening device.

18. The non-transitory, computer-readable memory of claim 16, wherein the testing further comprises:

fitting primitive geometries to each calculated point trajectory for one or more components of interest in the region of interest on the test structure, the fitted primitive geometries approximating the representation of the LV and the representation of the SV; and tracking relative centerline motion of the representation of the LV and the representation of the SV during separation using the fitted primitive geometries.

19. The non-transitory, computer-readable memory of claim 16, wherein testing further comprises:

detecting one or more impact shocks on the representation of the LV or the representation of the SV based on the calculated point trajectories for the one or more components of interest in the region of interest on the test structure; and quantifying the detected one or more impact shocks using local coordinate systems.

20. The non-transitory, computer-readable memory of claim 16, wherein testing further comprises:

determining a position for each of the one or more components of interest in an interface control document based on the calculated point trajectories for the one or more components of interest; and verifying stay out volumes using the determined position for each of the one or more components of interest.

* * * * *